(12) United States Patent
Murayama et al.

(10) Patent No.: US 10,562,606 B2
(45) Date of Patent: Feb. 18, 2020

(54) WING, FLAP, AND AIRCRAFT

(71) Applicant: JAPAN AEROSPACE EXPLORATION AGENCY, Chofu-shi, Tokyo (JP)

(72) Inventors: Mitsuhiro Murayama, Chofu (JP); Kazuomi Yamamoto, Chofu (JP)

(73) Assignee: JAPAN AEROSPACE EXPLORATION AGENCY, Tokyo (JP)

( * ) Notice: Subject to any disclaimer, the term of this patent is extended or adjusted under 35 U.S.C. 154(b) by 71 days.

(21) Appl. No.: 15/577,055

(22) PCT Filed: Apr. 14, 2016

(86) PCT No.: PCT/JP2016/061970
§ 371 (c)(1),
(2) Date: Nov. 27, 2017

(87) PCT Pub. No.: WO2016/189994
PCT Pub. Date: Dec. 1, 2016

(65) Prior Publication Data
US 2018/0170521 A1    Jun. 21, 2018

(30) Foreign Application Priority Data

May 28, 2015   (JP) ................. 2015-108517

(51) Int. Cl.
*B64C 9/20* (2006.01)
*B64C 23/06* (2006.01)
(Continued)

(52) U.S. Cl.
CPC .............. *B64C 9/20* (2013.01); *B64C 3/10* (2013.01); *B64C 9/18* (2013.01); *B64C 23/06* (2013.01); *Y02T 50/162* (2013.01)

(58) Field of Classification Search
CPC ..... B64C 9/18; B64C 23/065; B64C 2230/08; B64C 2230/14; B64C 2003/148; B64C 23/06
See application file for complete search history.

(56) References Cited

U.S. PATENT DOCUMENTS 3,578,264 A * 5/1971 Kuethe ............... B64C 21/10
                                        181/220
3,596,854 A * 8/1971 Haney, Jr. ........... B64C 23/065
                                        244/199.3

(Continued)

FOREIGN PATENT DOCUMENTS

EP        2692632 A1    2/2014
JP        54-33498 A    3/1979

(Continued)

OTHER PUBLICATIONS

International Search Report dated Jun. 7, 2016, issued in counterpart International Application No. PCT/JP2016/061970 (2 pages).

(Continued)

*Primary Examiner* — Richard R. Green
*Assistant Examiner* — Michael B. Kreiner
(74) *Attorney, Agent, or Firm* — Westerman, Hattori, Daniels & Adrian, LLP

(57) ABSTRACT

The present invention is directed to reducing noise resulting from a wing tip vortex of a wing such as a flap. A flap of an aircraft includes a flap main body provided to a parent wing in a deployable manner, and a vortex generation portion including a protruding member, the protruding member being provided to protrude from an upper surface at least at an end of the flap main body on an outboard side in a span direction and forming a predetermined angle to an axial direction of the aircraft. A rear end of the protruding member is located on the side adjacent to a side-end edge at the end of the flap main body in the span direction relative to a (Continued)

virtual line passing through a front end of the protruding member and being parallel to the axial direction.

13 Claims, 14 Drawing Sheets

(51) Int. Cl.
*B64C 3/10* (2006.01)
*B64C 9/18* (2006.01)

(56) References Cited

U.S. PATENT DOCUMENTS

| | | | |
|---|---|---|---|
| 4,477,042 A * | 10/1984 | Griswold, II | B64C 23/065 244/199.2 |
| 4,655,419 A * | 4/1987 | van der Hoeven | B64C 23/06 244/200.1 |
| 6,105,904 A | 8/2000 | Lisy et al. | |
| 2008/0217485 A1 | 9/2008 | Ikeda | |
| 2010/0294891 A1 | 11/2010 | Kelm | |
| 2011/0008174 A1 | 1/2011 | Ireland | |
| 2011/0315248 A1 * | 12/2011 | Simpson | F15D 1/003 137/561 R |
| 2012/0145826 A1 * | 6/2012 | Hirai | B64C 3/48 244/1 N |
| 2012/0256049 A1 | 10/2012 | Shmilovich et al. | |
| 2013/0037657 A1 | 2/2013 | Breidenthal | |
| 2014/0014780 A1 | 1/2014 | Isotani et al. | |

FOREIGN PATENT DOCUMENTS

| | | |
|---|---|---|
| JP | 1-285492 A | 11/1989 |
| JP | 4-103495 A | 4/1992 |
| JP | 2011-506160 A | 3/2011 |
| WO | 2007/077620 A1 | 7/2007 |
| WO | 2012/132420 A1 | 10/2012 |

OTHER PUBLICATIONS

Extended (supplementary) European Search Report dated Jan. 8, 2019, issued in counterpart EP Application No. 16799702.2. (9 pages).
Taro Imamura et al., Numerical Simulation of NACA0012 Wingtip Flow Leading to Noise Generation, 11th AIAA/CEAS Aeroacoustics Conference (26th AIAA Aeroacoustics Conference), May 23-25, 2005, pp. 1-16, Monterey, California.
Mitsuhiro Murayama et al., Numerical Investigation on Change of Airframe Noise by Flap Side-edge Shape, Aeroacoustics Conference (19th AIAA/CEAS Aeroacoustics Conference), May 27-29, 2013, pp. 1-19, Berlin, Germany.

* cited by examiner

WING, FLAP, AND AIRCRAFT

TECHNICAL FIELD

The present invention relates to a wing that is used for a flap or the like provided to an aircraft. Further, the present invention relates to a flap provided to an aircraft and the aircraft.

BACKGROUND ART

A flap as a high-lift device is provided at a trailing-edge of a main wing of an aircraft. The flap is deployed rearward and downward during take-off and landing, and thus necessary lift is generated.

With the flap being deployed from the main wing, a tip vortex is generated at the flap tip. The tip vortex flows on the upper surface of the flap, and noise is generated from pressure fluctuations resulting from that vortex on the surface of the flap. Although not limited to the flap provided to the aircraft, a wing as an object having a shape capable of efficiently obtaining lift by interactions with a fluid generates noise resulting from the wing tip vortex as described above.

Patent Document 1 discloses a technology of providing, in order to reduce such noise, a flow suppression portion on the upper surface side of a leading-edge of a tip end of a flap main body, the flow suppression portion separating a flow along the upper surface of the tip end.

In other words, the technology disclosed in Patent Document 1 separates the flow along the upper surface of the tip end of the flap main body and reduces lift at a flap end, to thus weaken a vortex at the flap end and reduce noise.

CITATION LIST

Patent Document

Patent Document 1: WO/2012/132420 (for example, description of claim 6)

DISCLOSURE OF INVENTION

Technical Problem

There are demands for a new technology to reduce noise resulting from a wing tip vortex in various technical fields using a wing including but not limited to a flap provided to an aircraft.

It is an object of the present invention to provide a wing, a flap, and an aircraft that are capable of reducing noise resulting from a wing tip vortex of the wing.

Solution to Problem

In order to solve the problems described above, a wing according to one embodiment of the present invention includes: a wing-like member that has an end surface at a wing tip; and a vortex generation portion that is provided in a region adjacent to the wing tip on an upper surface of the wing-like member and generates, from a fluid flowing in a wing span direction of the wing-like member, a second vortex having the same direction of rotation as that of a first vortex generated at the wing tip.

In the wing according to one embodiment of the present invention, since the vortex generation portion is provided in the region adjacent to the wing tip on the upper surface of the wing-like member, the second vortex collides with the first vortex. Since the second vortex has the same direction of rotation as that of the first vortex, this makes the first vortex an aggregation of a plurality of vortexes, and those vortexes are dispersed in a region wider than the region of the first vortex. Therefore, of the sound generated by pressure fluctuations due to those vortexes on the top of the upper surface of the wing-like member, the amount of sound passing around the wing tip of the wing-like member and moving downward is reduced. Further, since the second vortex has the same direction of rotation as that of the first vortex, when the second vortex collides with the first vortex, the first vortex and the second vortex each rotate from the predetermined center like, so to speak, a planet, and the first vortex moves in a direction separating from the top of the upper surface of the wing-like member. Therefore, the pressure fluctuation due to the first vortex on the top of the upper surface of the wing-like member becomes small, and sound generated on the top thereof becomes small. As a result, noise resulting from the wing tip vortex of the wing can be reduced.

In the wing according to one embodiment of the present invention, the vortex generation portion desirably includes a protruding member that forms a predetermined angle to a direction in which the fluid flows and that generates the second vortex. With this configuration, the vortex generation portion can be made simple and provided with durability, and weight saving can also be achieved.

In the wing according to one embodiment of the present invention, the protruding member is desirably provided so as to come close to the wing tip from a leading-edge of the wing-like member toward a trailing-edge of the wing-like member. With this configuration, the protruding member can be formed into a very simple shape, e.g., a plate-like shape, and the second vortex having the same direction of rotation as that of the first vortex generated at the wing tip can be generated.

In the wing according to one embodiment of the present invention, a region where the vortex generation portion is provided is desirably located near a leading-edge of the wing-like member. Further, a region where the vortex generation portion is provided is desirably in a range separated from a position of the wing tip of the wing-like member by a chord length of the wing-like member in the wing span direction of the wing-like member. Furthermore, the vortex generation portion desirably includes the protruding members arranged in the wing span direction of the wing-like member. With this configuration, noise resulting from the wing tip vortex of the wing can be reduced more efficiently.

A flap according to one embodiment of the present invention includes: a flap main body that is provided to a parent wing of an aircraft in a deployable manner; and a vortex generation portion that is provided in a region adjacent to a flap tip of the flap main body on an upper surface of the flap main body and generates, from a fluid flowing in an axial direction of the aircraft, a second vortex having the same direction of rotation as that of a first vortex generated at the flap tip. With this configuration, noise resulting from the tip vortex of the flap main body can be reduced.

In the flap according to one embodiment of the present invention, the vortex generation portion desirably includes a protruding member that forms a predetermined angle to a direction in which the fluid flows and that generates the second vortex. With this configuration, the vortex generation portion can be made simple and provided with durability, and weight saving can also be achieved.

In the flap according to one embodiment of the present invention, a rear edge of the protruding member is desirably located on the side adjacent to the flap tip of the flap main body in the span direction relative to a virtual line passing through a front edge of the protruding member and being parallel to the axial direction. With this configuration, the protruding member can be formed into a very simple shape, and the second vortex having the same direction of rotation as that of the first vortex generated at the flap tip can be generated.

In the flap according to one embodiment of the present invention, the vortex generation portion is desirably disposed in a region from a position of the flap tip of the flap main body to a position separated by a chord length of the flap main body in the span direction. Further, the vortex generation portion desirably includes the protruding members, and the protruding members are desirably arranged in the span direction. With this configuration, noise resulting from the tip vortex of the flap can be reduced more efficiently.

In the flap according to one embodiment of the present invention, the protruding member is desirably disposed near the leading-edge of the flap main body such that the protruding member is exposed from the parent wing when the flap main body is deployed, and that the protruding member is hidden by the parent wing when the flap main body is retracted in the parent wing. With this configuration, the protruding member does not affect high-speed cruising other than low-speed flight.

An aircraft according to one embodiment of the present invention includes the flap having the embodiment described above. With this configuration, noise at least during landing can be reduced.

A flap of an aircraft according to one embodiment of the present invention includes an installation portion that is provided on an upper surface of the flap at least at an end on the outer board side in a span direction and on which a device protruding from the upper surface can be installed. The installation portion includes two or more fastener insertion portions into which fasteners are inserted. Of those fastener insertion portions, a fastener insertion portion disposed relatively rearward is located on the side adjacent to a flap tip surface at the end of the flap main body in the span direction, relative to a virtual line passing through a fastener insertion portion disposed relatively forward and being parallel to an axial direction. Here, the device protruding from the upper surface is a protruding member forming a vortex generation portion according to the present invention.

Advantageous Effects of Invention

According to the present invention, it is possible to reduce noise resulting from a wing tip vortex of a wing such as a flap.

MODE(S) FOR CARRYING OUT THE INVENTION

Hereinafter, embodiments of the present invention will be described with reference to the attached drawings.

First Embodiment

Figure 1:
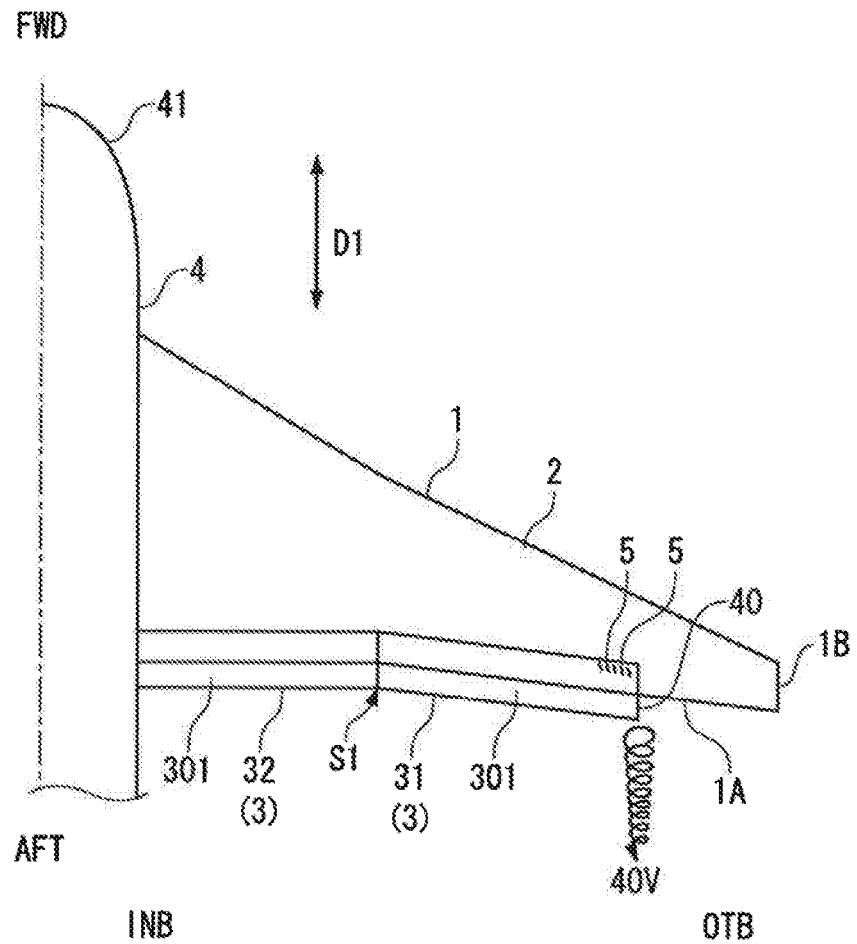
FIG. 1 is a plan view of a starboard side of an aircraft according to a first embodiment.

A flap 3 is provided to a trailing-edge 1A of a main wing 1 of an aircraft of a first embodiment shown in FIG. 1.

The main wing 1 includes a parent wing 2 that is provided with the flap 3 in a retractable manner and a deployable manner, and the flap 3 as a high-lift device.

The flap 3 is deployed from the parent wing 2 as shown in FIG. 1 during low-speed flight such as takeoff and landing, to generate high lift. The flap 3 is retracted in the parent wing 2 during high-speed cruising other than the low-speed flight.

The flap 3 includes an outboard flap 31 located on the wing tip 1B side of the main wing 1 and an inboard flap 32 located on the fuselage 4 side on which the main wing 1 is provided. Those outboard flap 31 and inboard flap 32 are collectively referred to as flap(s) 3.

The outboard flap 31 and the inboard flap 32 are simultaneously deployed and simultaneously retracted. A gap S1 between the outboard flap 31 and the inboard flap 32 is sealed with a rubber seal (not shown in the figure).

Hereinafter, a direction along an axis line (chain line) set for the fuselage 4 is defined as an axial direction D1. In the axial direction D1, the nose 41 side of the aircraft is referred to as "forward" and the tail side thereof is referred to as "rearward".

Further, in each of the left side and the right side of the fuselage 4, the fuselage 4 side of the main wing 1 in a span direction is referred to as an inboard side, and the opposite side thereof is referred to as an outboard side.

Furthermore, the upper surface side of the main wing 1 as a suction surface is referred to as "upper" and the lower surface side of the main wing 1 as a pressure surface is referred to as "lower".

It should be noted that "forward" is represented by "FWD", "rearward" is represented by "AFT", "upper" is represented by "UPR", "lower" is represented by "LWR", "inboard side" is represented by "INB", and "outboard side" is represented by "OTB" in the figures.

Figure 2:
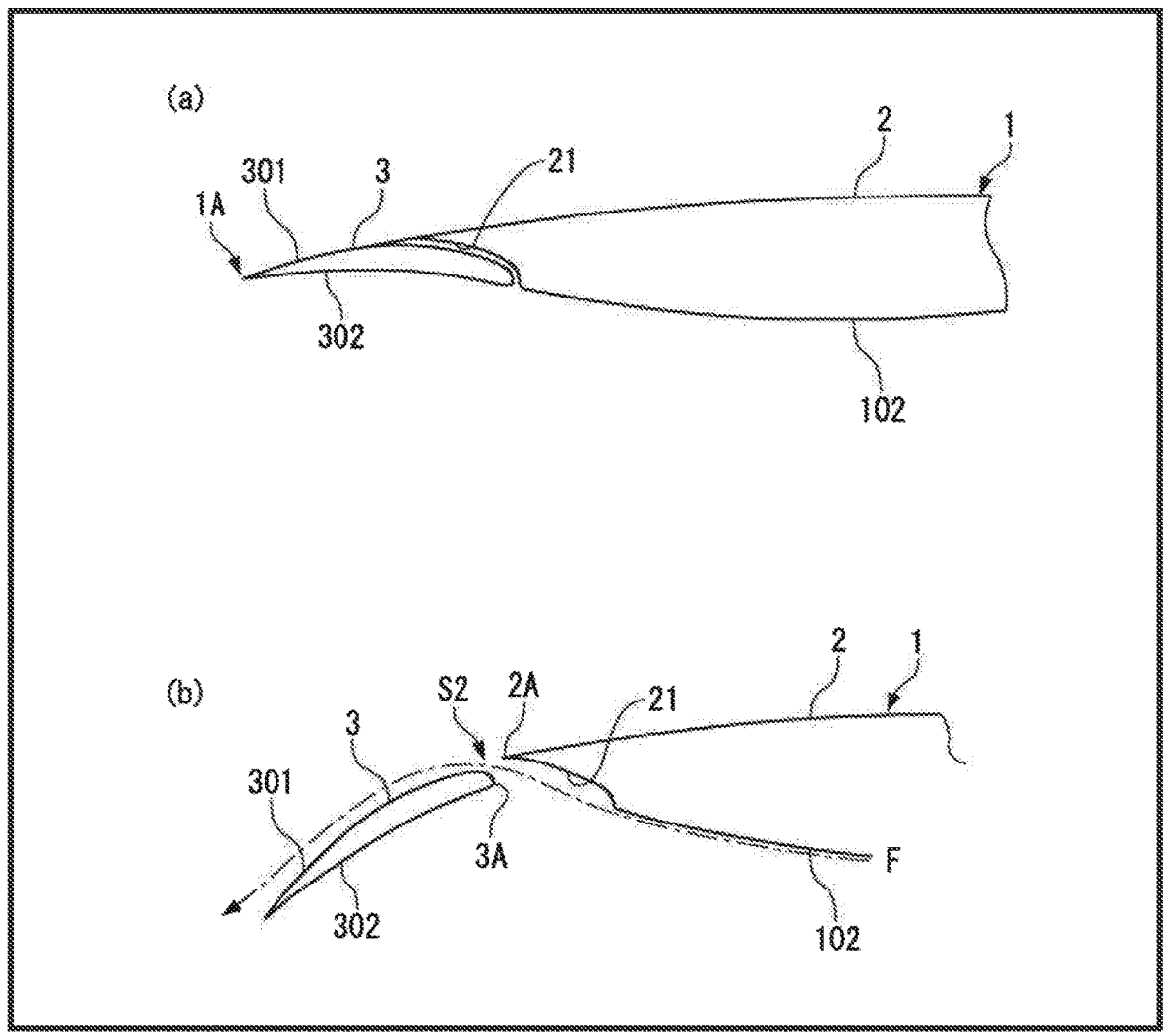
FIG. 2 (*a*) is a diagram showing a state where a flap of the aircraft is retracted, and (*b*) is a diagram showing a state where the flap is deployed.

During high-speed cruising of the aircraft, the flap 3 is retracted in a cove portion 21 prepared in the parent wing 2 as shown in FIG. 2(a). At that time, the flap 3 is integrated with the parent wing 2 to form the trailing-edge 1A of the main wing 1. When the flap 3 is retracted, a lower surface 302 of the flap 3 is wholly exposed on the lower side of the parent wing 2.

The flap 3 is driven by an actuator that is not shown in the figure, to be deployed rearward and downward. At this time, the flap 3 is guided by a track that is not shown in the figure.

FIG. 2(b) shows a state where the flap 3 is deployed to a flap position for landing. At this time, the whole of the flap 3 is exposed from the parent wing 2, and thus an area of the main wing 1 is increased. An interstice S2 is present between a leading-edge 3A of the flap 3 and a trailing-edge 2A of the parent wing 2.

When the flap 3 is deployed, as indicated by a chain line in FIG. 2(b), an airflow F from the lower surface 102 side of the main wing 1 is narrowed down by the interstice S2 and flows to the upper surface 301 side of the flap 3 at high speed. This flowing and the fact that an angle of attack is imparted to the flap 3 cause a large flow velocity difference between the upper surface 301 side and the lower surface 302 side of the flap 3. Thus, a large pressure difference corresponding to the flow velocity difference is obtained. This can contribute to generation of high lift.

As shown in FIG. 1, the flap 3 includes a flap tip 40 disposed in the airflow when deployed. The flap tip 40 corresponds to an end of the outboard flap 31 on the outboard side OTB and has an end surface having a predetermined area. At the flap tip 40, due to the pressure difference described above, an airflow going around from the lower surface 302 side to the upper surface 301 side of the flap 3 generates a flap tip vortex 40V.

Figure 3:
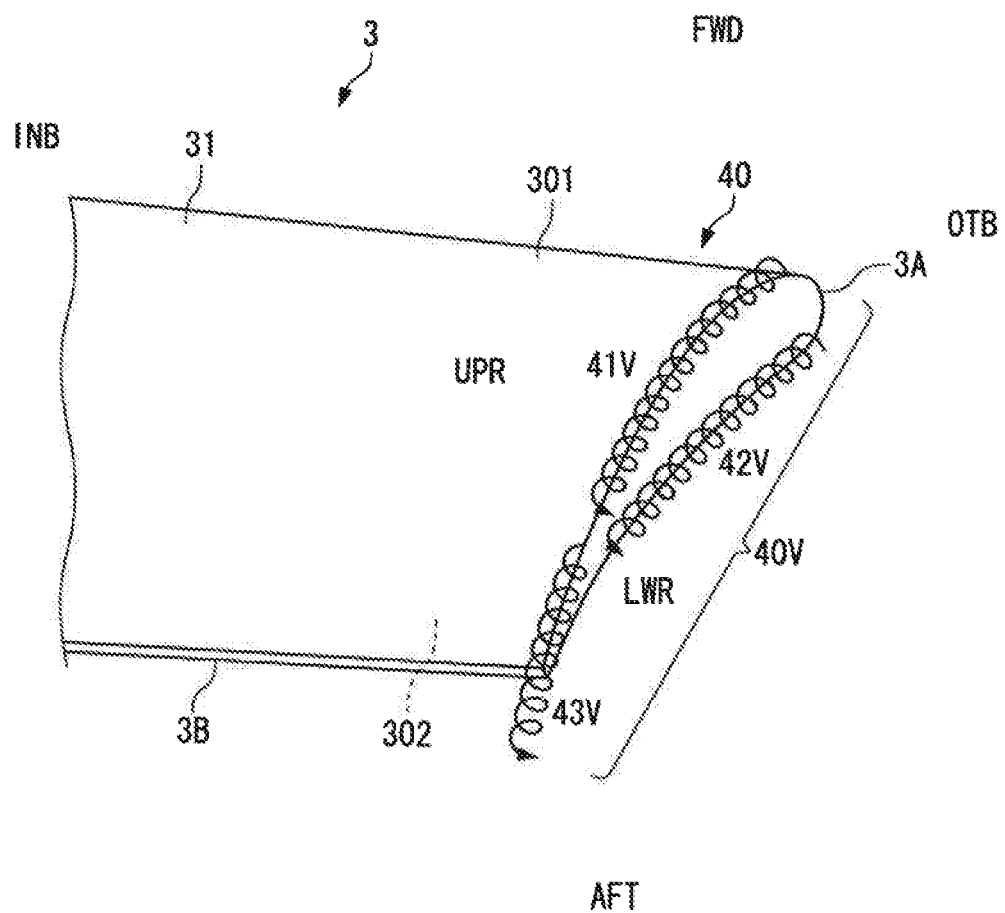
FIG. 3 is a diagram showing a basic form of the flap and a flap tip vortex.

The flap tip vortex 40V will be described with reference to FIG. 3 showing the basic form of the flap 3 (the form in which a vortex generation portion according to the present invention is not provided).

As shown in FIG. 3, a vortex generated at the leading-edge 3A of the flap tip 40 travels to the upper-surface 301 side and the lower surface 302 side of the flap 3. Each of an upper-side vortex 41V and a lower-side vortex 42V flows rearward while tracing a spiral having an orientation toward the upper surface 301 side from the lower surface 302 side. The lower-side vortex 42V gradually moving upward and the upper-side vortex 41V then join together. The upper-side vortex 41V, the lower-side vortex 42V, and a vortex 43V obtained after the joining thereof are collectively referred to as the flap tip vortex 40V.

In this embodiment, the end of the inboard flap 32 (FIG. 1) on the inboard side INB is adjacent to the fuselage 4, and the gap S1 between the inboard flap 32 and the outboard flap 31 is occluded with a seal. Thus, at both ends of the inboard flap 32 and the end of the outboard flap on the inboard side INB, no flap tip vortex is generated, or if generated, the flap tip vortex is minor.

A pressure of the airflow forming the flap tip vortex 40V generated at the flap tip 40 of the flap 3 fluctuates temporally and spatially, and such pressure fluctuations induced become sound on the surface of the flap 3 and are propagated around. The propagated sound is to be a source of noise.

Compared with the time of takeoff where the flap 3 is partially deployed, at the time of landing where the flap 3 is completely deployed so as to be wholly exposed (FIG. 2(b)), the pressure difference resulting from the flow velocity difference between the upper surface 301 and the lower surface 302 becomes large. Thus, the fluctuations of the vortex have larger energy, and larger noise is generated. Besides, since the thrust of an engine that generates noise is low during landing, the noise from the flap tip 40 of the flap 3 becomes prominent.

Figure 4:
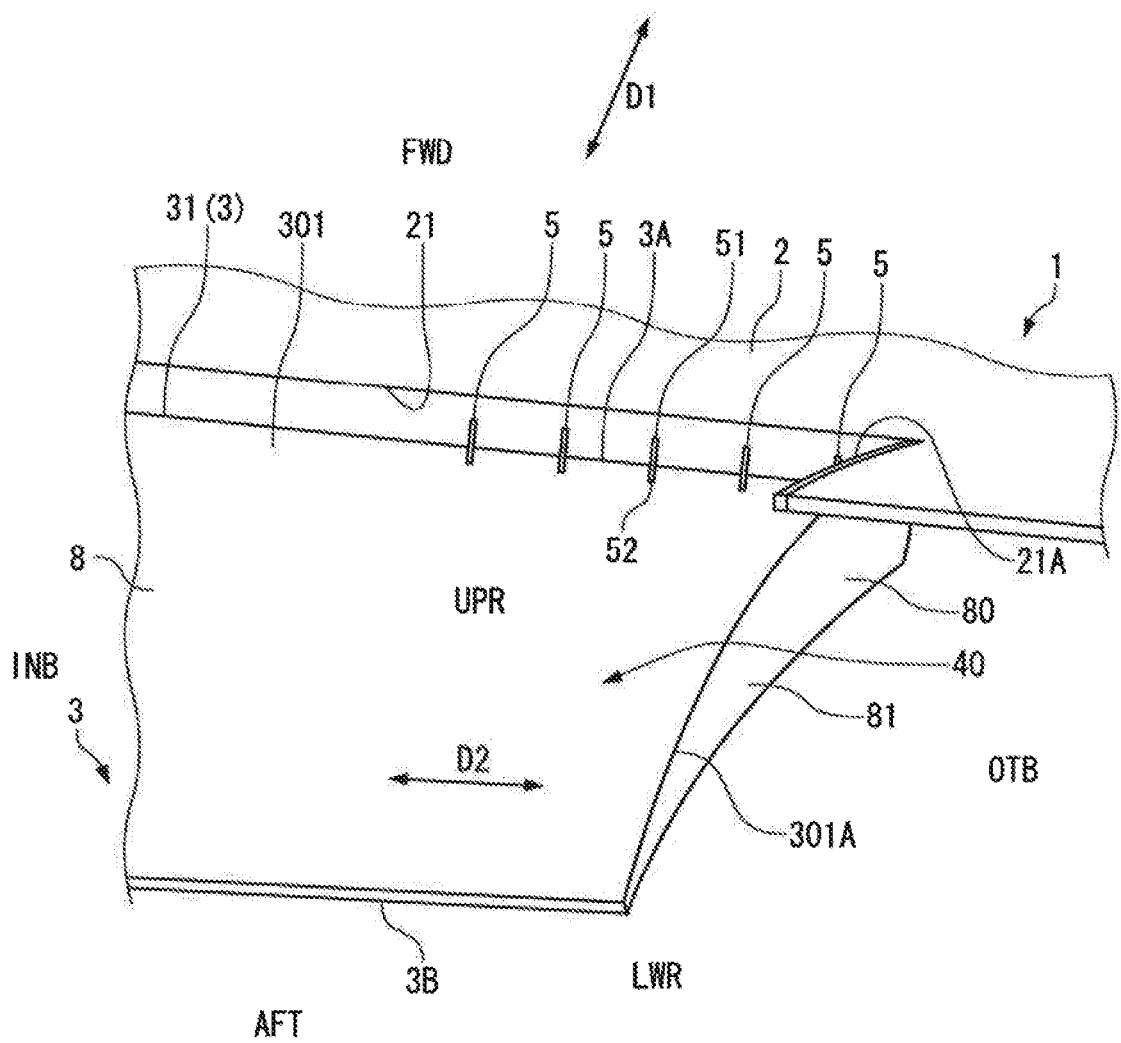
FIG. 4 is a perspective view of a flap tip of the flap and a vortex generation portion provided as a noise reduction device on an upper surface of the flap.
Figure 5:
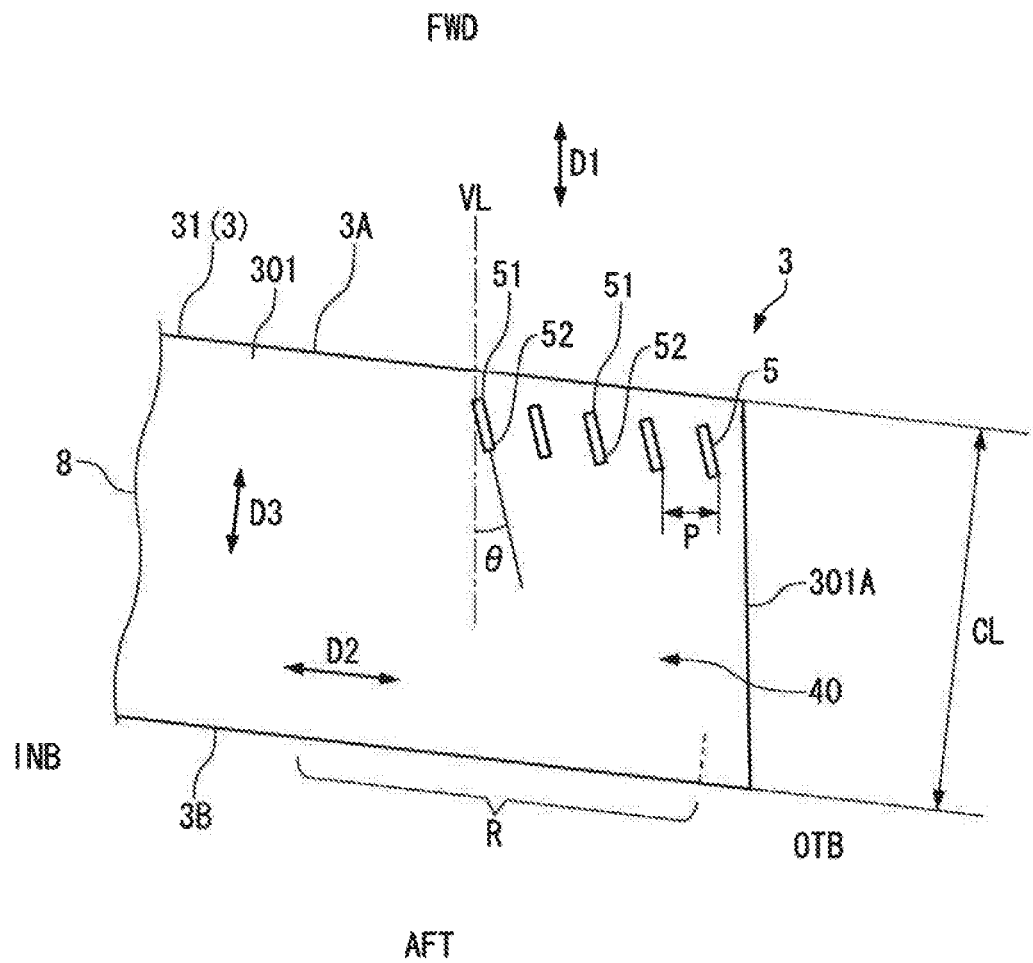
FIG. 5 is a plan view of the flap tip of the flap and the vortex generation portion provided as a noise reduction device on the upper surface of the flap.

In order to reduce the noise resulting from the flap tip vortex 40V during landing or the like, as shown in FIGS. 4 and 5, the flap 3 includes a vortex generation portion 50 serving as a noise reduction device adjacently to the flap tip 40 of the upper surface 301.

The flap 3 includes the vortex generation portion 50 and a flap main body 8 provided with the vortex generation portion 50. Constituent elements of the flap 3 can be each formed using appropriate materials such as metal and a fiber-reinforced resin.

Although not specifically shown in the figure, the flap main body 8 has a box structure including a plurality of ribs disposed along the axial direction D1, a front spar coupling front ends of the respective ribs, a rear spar coupling rear ends of the respective ribs, an upper skin, and a lower skin.

The flap main body 8 is formed into a shape in which a dimension of the main wing 1 in the span direction is longer than a dimension in the axial direction D1 and a cross section thereof is wing-shaped. End ribs 80 are disposed at both ends of the flap main body 8. Each of the end ribs 80 forms an end surface 81 of the flap main body 8. When the flap 3 is retracted, the end surface 81 faces an inner wall 21A formed in the cove portion 21 of the parent wing 2. The end surface 81 of the outboard flap 31 on the outboard side OTB in this embodiment forms a predetermined angle to the axial direction D1, but may be formed parallel to the axial direction D1.

Description will be given on the configuration of the vortex generation portion 50 that achieves noise reduction by generating a vortex to interfere with the flap tip vortex 40V.

The vortex generation portion 50 includes a rectangular, plate-like protruding member 5 that is provided to the flap tip 40 of the flap main body 8 so as to protrude in an out-of-plane direction from the upper surface 301 and forms a predetermined angle θ to the axial direction D1 when viewed from the upper surface. This angle θ (FIG. 5) is approximately 20° as an example.

The vortex generation portion 50 in this embodiment includes a plurality of protruding members 5. As a matter of course, the vortex generation portion 50 may be constituted of one protruding member 5.

The protruding members 5 in each case form a predetermined angle to the axial direction D1 in the same orientation and extend by a predetermined length.

Those protruding members 5 are arranged at predetermined intervals in the span direction D2 (wing span) of the flap 3.

The protruding members 5 do not necessarily need to be arranged at regular intervals.

Further, the protruding members 5 do not necessarily have the same height, the same angle θ, and the same length.

Positions of the plurality of protruding members 5 in a chord direction D3 (FIG. 5) may not be unified. For example, the plurality of protruding members 5 can be disposed with intervals therebetween in the span direction D2 and at positions alternately sifted.

Further, the protruding members 5 can be disposed so as to form a plurality of rows. For example, the first row of the protruding members 5 can be disposed in the vicinity of the leading-edge 3A of the flap 3, and the second row of the protruding members 5 can be disposed rearward relative to the former protruding members 5.

As shown in FIGS. 4 and 5, each of the protruding members 5 includes a front end 51 located forward and a rear end 52 located rearward.

The front end 51 is disposed in proximity to the leading-edge 3A of the flap main body 8.

When a virtual line VL (FIG. 5) passing through the front end 51 and being parallel to the axial direction D1 is set, the rear end 52 is located on the side adjacent to a side-end edge 301A of the upper surface 301 of the flap main body 8 relative to the virtual line VL.

In other words, the protruding member 5 forms a predetermined angle to the axial direction D1 when viewed from the upper surface so as to come close to the side-end edge 301A of the upper surface 301 from the front end 51 toward the rear ends 52. With this configuration, a direction of rotation of a vortex 5V generated by the vortex generation portion 50 becomes the same as a direction of rotation of the flap tip vortex 40V that will be described later.

The protruding member 5 of this embodiment is a protrusion formed to have a rectangular cross section over the entire length extending from the front end 51 to the rear end 52, but the protruding member 5 is not limited thereto. The form of the protruding member 5 can be appropriately determined. For example, the protruding member 5 may be formed into a triangular shape when viewed from the span direction D2 or formed into a semicircular shape when viewed from the span direction D2.

As shown in FIG. 4, when the flap 3 is deployed to a position for landing, the protruding members 5 are exposed over the entire length thereof from the parent wing 2.

Figure 6:
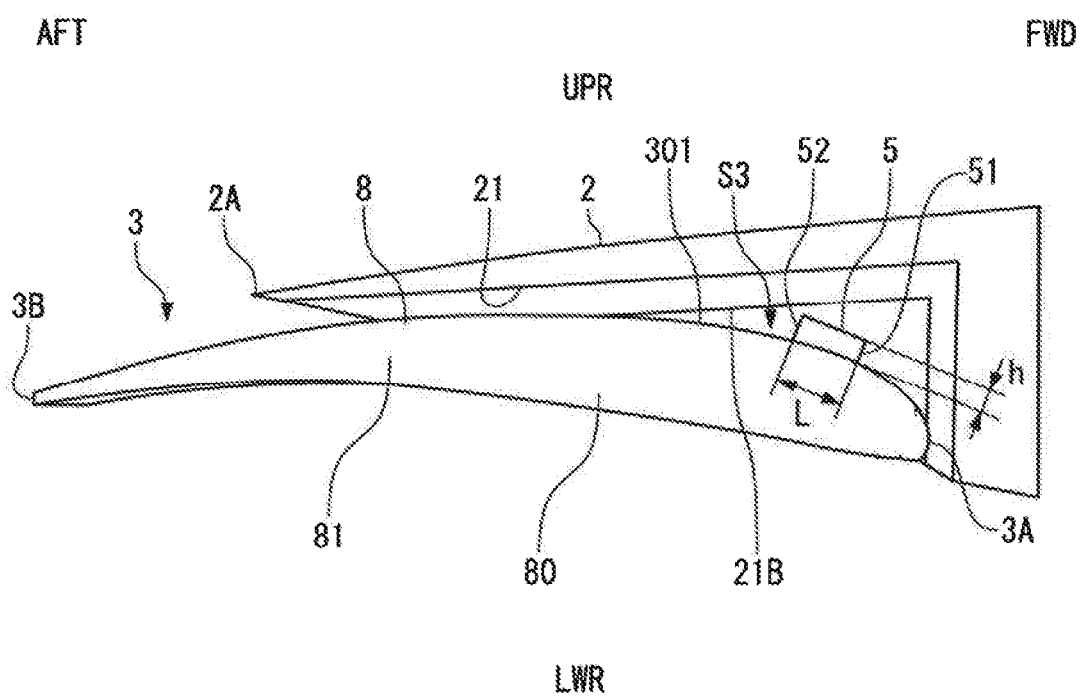
FIG. 6 is a side view of an end surface of the flap shown in FIGS. 4 and 5.

Meanwhile, during cruising, as shown in FIG. 6, the flap 3 is retracted in the parent wing 2. The rear ends 52 of the protruding members 5 are located forward relative to the trailing-edge 2A of the parent wing 2, and the whole of the protruding members 5 is hidden by the parent wing 2.

When the flap 3 is deployed, the protruding members 5 are subjected to the airflow and exert a noise reduction effect.

It should be noted that there may be cases where the protruding members 5 are hidden by the parent wing 2 and where the protruding members 5 are not hidden by the parent wing 2 during takeoff or at an intermediate flap deflection angle. In the case where the protruding members 5 are not hidden by the parent wing 2 and some of the protruding members 5 are exposed, there is also an airflow passing through a slot between the parent wing 2 and the flap 3 and some of the protruding members 5 are subjected to the airflow. Thus, in this case, the protruding members 5 that are configured to be exposed during takeoff or the like can provide noise reduction.

When hidden by the parent wing 2, the protruding members 5 are disposed in a space S3 between the upper surface 301 of the flap 3 and a wall 21B of the cove portion 21 prepared in the parent wing 2.

When the flap 3 is deployed to a predetermined position for take-off, the protruding members 5 may be exposed from the parent wing 2 or disposed in the space S3.

When the flap 3 is deployed, a slot through which the airflow from the lower surface side of the parent wing 2 passes is formed between the parent wing 2 and the flap 3. Thus, even if the protruding members 5 are not exposed from the parent wing 2, the protruding members 5 exert a noise reduction effect by being subjected to the airflow passing through the slot.

The protruding members 5 are formed in a predetermined height so as to be retracted in the space S3.

A predetermined clearance is set between the upper end of the protruding member 5 and the wall 21B of the cove portion 21. This can prevent the protruding member 5 from interfering with the parent wing or a peripheral member (spoiler or the like).

The height of the protruding member 5 from the upper surface 301 is desirably twice or more than twice the thickness of a boundary layer generated on the surface of the flap main body 8 where the protruding members 5 are installed, because of the necessity of generating a vortex 5V (FIG. 7) that interferes with the flap tip vortex 40V as will be described later. The height of the protruding member 5 from the upper surface 301 can be appropriately determined as long as the protruding member 5 does not interfere with the main wing 2 or the like.

A relationship between the length and the height of the protruding member 5 is desirably as follows: $L/h>1$, where the length is L and the height is h. More desirably, $L/h$ is 3 to 10. When $L/h$ is excessively small, the vortex 5V to be generated becomes weak. Thus, the noise reduction effect obtained by causing the vortex 5V to interfere with the flap tip vortex 40V becomes small. Further, when $L/h$ is excessively large, the vortex 5V to be generated is excessively strong and becomes a new source of sound or reduces aerodynamic performance.

The angle θ (FIG. 5) of the protruding member 5 to the axial direction D1 can be appropriately determined as long as an appropriate vortex 5V that interferes with the flap tip vortex 40V can be generated.

A desirable angle θ of the protruding member 5 to the axial direction D1 is 10° to 30°. When the angle θ is smaller than the angle range described above, the vortex 5V to be generated becomes weak. Thus, the noise reduction effect obtained by causing the vortex 5V to interfere with the flap tip vortex 40V becomes small. Further, when the angle θ is larger than the angle range described above, the vortex 5V to be generated is excessively strong and becomes a new source of sound or reduces aerodynamic performance.

An optimal angle θ at which an excellent noise reduction effect was observed was 20° in a wind-tunnel test described below.

An interval (pitch) P (FIG. 5) between the adjacent protruding members 5 can be appropriately determined and is desirably 2 to 10 as a ratio (P/h) to the height h. With the interval having such a range, interference between the vortexes 5V respectively generated by the adjacent protruding members 5 can be suppressed, and the vortexes 5V can thus be caused to sufficiently interfere with the flap tip vortex 40V. Meanwhile, when P/h is smaller than 2, the vortexes 5V generated in the adjacent protruding members 5 are buffered, the energy of the vortexes 5V is dispersed, and the vortexes 5V cannot be caused to sufficiently interfere with the flap tip vortex 40V. Further, when P/h is larger than 10, each vortex 5V cannot be caused to continuously interfere with the flap tip vortex 40V. This may make the noise reduction effect insufficient.

The protruding members 5 can be integrally formed with the flap main body 8 when the flap main body 8 is manufactured. Alternatively, the protruding members 5 manufactured separately from the flap main body 8 can also be joined to the upper surface 301 of the flap main body 8 by an appropriate method such as bonding or fastening.

In the chord direction D3 (FIG. 5) of the flap 3, the vortex generation portion 50 including the protruding members 5 is desirably located forward relative to a position in the chord direction D3 where a lower-side flap tip vortex 42V to be described later moves upward and loins to an upper-side flap tip vortex 41V. Thus, in the chord direction D3, the front end 51 of the protruding member 5 is desirably located in the range of 0% to 60% of a chord length CL of the flap main body 8 from the leading-edge 3A of the flap main body 8.

The front end 51 of the protruding member 5 in this embodiment is separated from the leading-edge 3A by approximately 10% of the chord length CL of the flap main body 8 in the chord direction D3.

Further, the vortex generation portion 50 including the protruding members 5 is desirably disposed in a region R (FIG. 5) ranging from a position of the adjacent side-end edge 301A to a position separated by the chord length CL in the span direction D2. Pressure fluctuations due to the airflow by the flap tip vortex 40V are prominently large over the region R, and sound to be noise is generated in this region R. Thus, when the vortex generation portion 50 is provided at a corresponding position, noise resulting from the flap tip vortex 40V can be reliably reduced.

As in this embodiment, in the case where the vortex generation portion 50 includes a plurality of protruding members 5, it is only necessary to dispose the head protruding member 5, which is the closest to the side-end edge 301A in a direction in which the protruding members 5 are arranged (span direction D2), right by the side-end edge 301A and arrange the protruding members 5 with a predetermined pitch P from the former protruding member 5.

Hereinafter, the noise reduction effect by the flap 3 of this embodiment will be described.

Noise is generated on the upper surface of the flap 3 by the following mechanism. Specifically, a pressure of the airflow forming the flap tip vortex 40V generated at the flap tip 40 of the flap 3 fluctuates temporally and spatially. Mien that flap tip vortex 40V flows to the top of the upper surface of the flap 3, the pressure fluctuations by the flap tip vortex 40V become sound on the top of the upper surface of the flap 3 and are propagated around. The propagated sound is to be a source of noise.

Since the upward direction of the flap 3 is a direction toward the sky, there are no people. Noise becomes a practical problem in the downward direction of the flap 3 in which there are people subjected to noise. Therefore, when noise in the downward direction of the flap 3 (on the lower side of an airplane) becomes small, it follows that the noise is reduced.

In this embodiment, the flap tip vortex 40V generated at the flap tip 40 of the flap 3 collides with the vortex 5V generated by the vortex generation portion 50 and becomes an aggregation of a plurality of vortexes. Here, the direction of rotation of the flap tip vortex 40V and that of the vortex 5V are the same, and thus the aggregation of those vortexes is dispersed in the span direction of the flap 3, i.e., in a direction separating from the flap tip 40 of the flap 3. Due to those dispersed vortexes, sound (noise) is generated on the top of the upper surface of the flap 3.

Meanwhile, in the case where the vortex generation portion 50 is not provided, the flap tip vortex 40V generated at the flap tip 40 of the flap 3 becomes sound (noise) as it is on the top of the upper surface of the flap 3. The center of a position where the sound is generated is closer to the flap tip 40 of the flap 3 than the center of a position where the sound by the dispersed vortexes described above is generated. Conversely, the center of the position where the sound by the dispersed vortexes is generated is farther from the flap tip 40 of the flap 3, and thus noise on the lower side of the flap 3 through the flap tip 40 of the flap 3 becomes small. In other words, when the vortex generation portion 50 is provided, noise on the lower side of the aircraft becomes small.

Further, since the vortex generation portion 50 is provided, the flap tip vortex 40V generated at the flap tip 40 of the flap 3 is involved in the vortexes 5V generated by the vortex generation portion 50 and is moved away from the top of the upper surface of the flap 3. Specifically, by joining of the flap tip vortex 40V and the vortexes 5V, the flap tip vortex 40V and the vortexes 5V each rotate from the predetermined center like, so to speak, a planet and proceed. As a result, the flap tip vortex 40V is moved away from the top of the upper surface of the flap 3. With this configuration, the pressure fluctuations of the airflow flowing on the top of the upper surface of the flap 3 can be made small and the noise can be reduced.

A general vortex generator is disposed in a span direction near the leading-edge of the main wing or near a control surface, and is used as an aerodynamic device that suppresses separation of a boundary layer due to a shock wave or the like during high-speed flight and suppresses vibrations or deterioration in steering effectiveness. Further, this general vortex generator is disposed in a wide range of the flap in the span direction, and is used as a device that similarly suppresses separation of a boundary layer on the flap during low-speed flight and improves aerodynamic characteristics. The vortex generation portion 50 according to the present invention is different from the general vortex generator having an object of improving aerodynamic characteristics, and has an action/effect different from that of the general vortex generator in that the noise reduction effect is exerted when the flap tip vortex 40V is moved away from the top of the upper surface of the flap 3.

More specifically, an action of the vortex generation portion 50 (protruding members 5) will be described.

Each of the protruding members 5 generates the vortex 5V that interferes with the flap tip vortex 40V.

Figure 7:
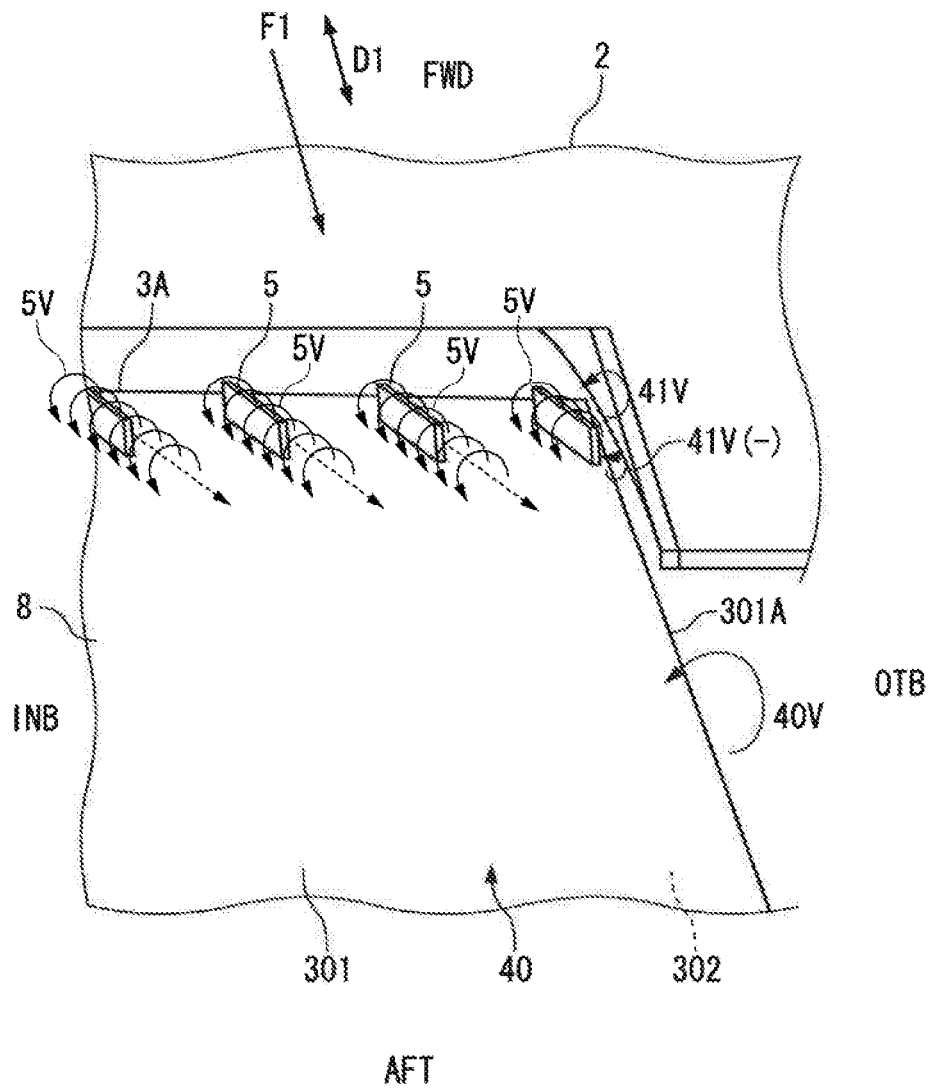
FIG. 7 is a diagram showing a state where a vortex generated by the vortex generation portion interferes with an upper-side flap tip vortex.

FIG. 7 shows an airflow F1, which flows into the flap main body 8 from forward to rearward, by an arrow of a straight line. This airflow F1 is parallel to the axial direction D1, and each of the protruding members 5 forms a predetermined angle to the airflow F1. When the airflow F1 flows through the protruding member 5 to cause a pressure difference between the left-surface side and the right-surface side of the protruding member 5, the vortex 5V indicated by curved arrows is generated in the orientation of rotation of the arrows. When viewed from rearward as shown in FIG. 7, the orientation of the vortex 5V is expressed by arrows toward the left (counterclockwise). The vortex 5V flows rearward while rotating in a spiral manner in the orientation of a right-handed screw (FIG. 8(a)). This orientation of rotation of the vortex 5V is similar to the orientation of rotation of the flap tip vortex 40V that is generated in an orientation going around from the lower surface 302 to the upper surface 301 at the flap tip 40. The generated vortex 5V follows the protruding member 5 to move toward the side-end edge 301A side while proceeding rearward (see an arrow of a broken line).

The vortex 5V is generated from each of the protruding members 5 arranged on the upper surface 301 of the flap tip 40.

The vortexes 5V that are generated from the respective protruding members 5 and moved to the side-end edge 301A side interfere with the upper-side flap tip vortex 41V to become a plurality of vortexes. Here, the direction of rotation of the upper-side flap tip vortex 41V and that of the vortexes 5V are the same, and thus the aggregation of those vortexes is dispersed in the span direction of the flap 3, i.e., in a direction separating from the flap tip 40 of the flap 3. The center of a position where sound by the dispersed vortexes is generated is farther from the flap tip 40 of the flap 3, and thus noise on the lower side of the flap 3 through the flap tip 40 of the flap 3 becomes small. In other words, when the vortex generation portion 50 is provided, noise on the lower side of the aircraft becomes small.

Figure 8:
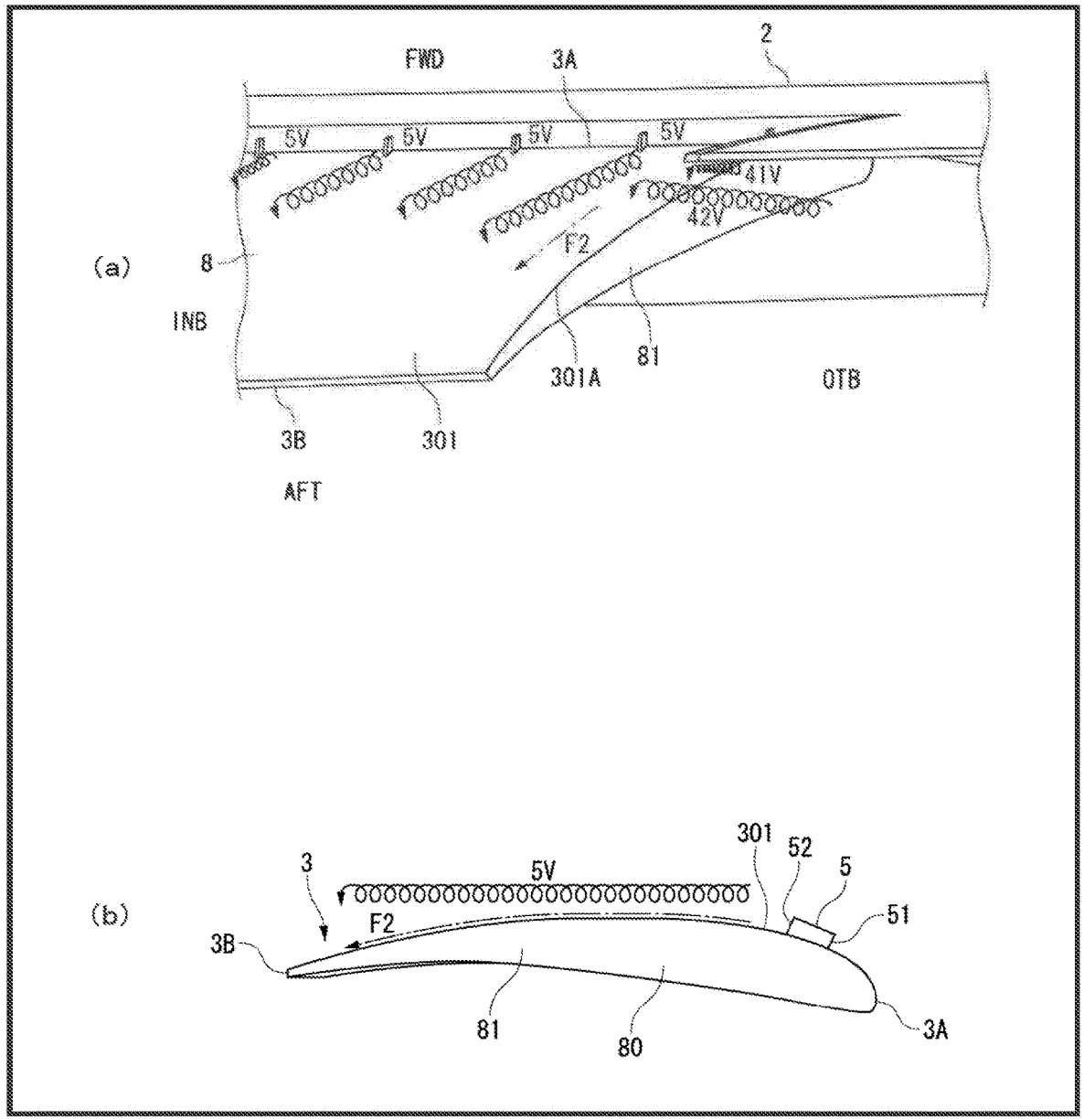
FIG. 8 is a diagram showing a state where the flap tip vortex is involved in the vortex generated by the vortex generation portion and flows rearward.

The vortexes 5V involving the upper-side flap tip vortex 41V further involves the lower-side flap tip vortex 42V and flows rearward as shown in FIG. 8(a).

FIGS. 8(a) and (b) shows, by an arrow of a chain line, a path F2 through which the upper-side flap tip vortex 41V and the lower-side flap tip vortex 42V join and flow, assuming that the upper-side flap tip vortex 41V is not subjected, to interference of the vortexes 5V. The path F2 is substantially along the upper surface 301 of the flap main body 8, whereas the path of the vortexes 5V is separated from the upper surface 301 of the flap main body 8 (FIG. 8(b)). In other words, the upper-side flap tip vortex 41V and the lower-side flap tip vortex 42V are involved by the vortexes 5V and raised from the original path F2, and thus moved away from the upper surface 301 of the flap main body 8. This is because, by joining of the flap-tip vortex 40V and the vortexes 5V, the flap tip vortex 40V and the vortexes 5V each rotate from a predetermined center point like, so to speak, a planet and proceed, resulting in that the flap tip vortex 40V is moved away from the top of the upper surface of the flap 3.

As described above, when caused to interfere with the vortexes 5V generated by the vortex generation portion 50, the upper-side flap tip vortex 41V is dispersed into a plurality of vortexes, and noise on the lower side of the flap 3 through the flap tip 40 of the flap 3 becomes small. Additionally, the upper-side flap tip vortex 41V and the lower-side flap tip vortex 42V joined therewith are involved in the vortexes 5V, and thus the flap tip vortex 40 is moved away from the surface of the flap 3. Thus, the pressure fluctuations of the airflow flowing on the surface of the flap 3 become small, and noise itself to be generated also becomes small.

As described above, the protruding members 5 of this embodiment are located forward relative to a joining position of the upper-side flap tip vortex 41V and the lower-side flap tip vortex 42V on the upper surface 301 of the flap 3 and located near the leading-edge 3A of the flap 3. The vortexes 5V generated by the protruding members 5 interfere with the upper-side flap tip vortex 41V at an early stage after generated at the leading-edge 3A of the flap 3. By the interference of the vortexes 5V, the upper-side flap tip vortex 41V is separated from the surface of the flap 3 and involved in the vortexes 5V. The lower-side flap tip vortex 42V joins that vortex flow.

When the protruding members 5 are disposed near the leading-edge 3A, due to the interference of the vortexes 5V, the flap tip vortex 41V is early separated from the surface of the flap 3, and the pressure fluctuations on the top of the upper surface of the flap 3 are further decreased accordingly. Thus, noise can be further reduced.

According to this embodiment, merely providing the protruding members 5 to the flap main body 8 can reduce, for example, noise during landing for which noise reduction is particularly demanded. The protruding members 5 are small and lightweight pieces in a minute region of the upper surface 301 of the flap 3, and thus hardly increase the weight of the flap 3.

Further, since the protruding members 5 are hidden by the parent wing 2 when the flap 3 is retracted, aerodynamic performance during cruising is not affected.

Of course, some or the whole of the protruding members 5 may be located at positions in the chord direction D3, in which the protruding members 5 are exposed from the parent wing 2 during take-off. Also in such a case, the influence of the protruding members 5 on the airflow is small, and noise during takeoff can foe reduced by the action of the protruding members 5. Thus, predetermined aerodynamic performance during takeoff can be achieved.

Hereinafter, the angle θ of the protruding member 5 to the axial direction D1 will be described.

Figure 9:
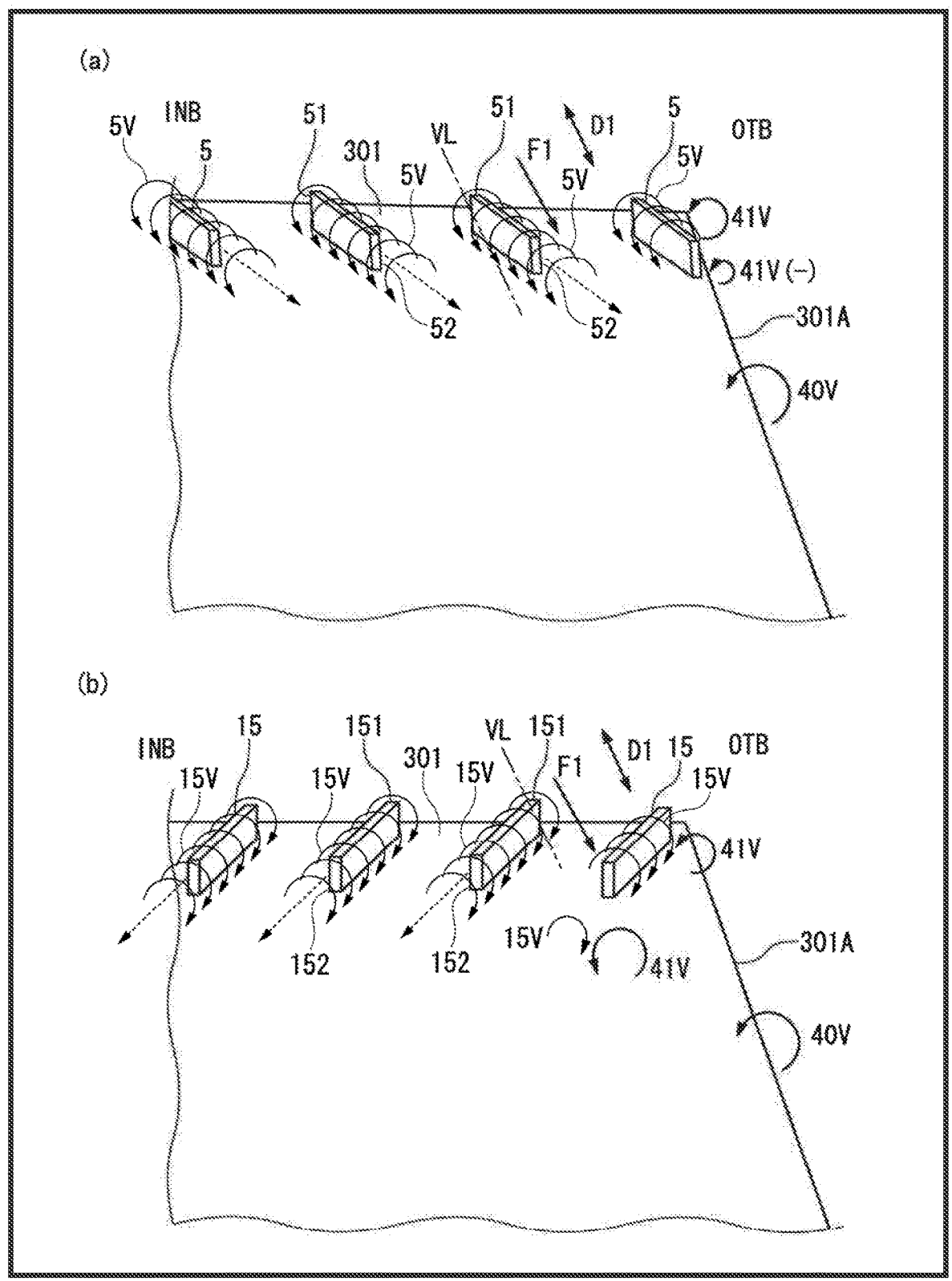
FIG. 9 (*a*) is a diagram of a protruding member of the first embodiment, and (*b*) is a diagram of a protruding member that forms an angle θ to an axis direction D1 in the orientation opposite to that of the protruding member of (*a*).

FIG. 9(a) shows the protruding members 5 of this embodiment. FIG. 9(b) shows protruding members 15 each having a predetermined angle θ in an orientation opposite to that of the protruding members 5 of FIG. 9(a).

Each of the protruding members 15 shown in FIG. 9(b) forms an angle θ to the axial direction D1 so as to separate from the side-end edge 301A of the upper surface 301 from a front end 151 toward a rear end 152.

When a virtual line VL passing through the front end 151 and being parallel to the axial direction D1 is set, the rear end 152 of the protruding member 15 is located on the side separated from the side-end edge 301A relative to the virtual line VL.

When the airflow F1 flows through the protruding member 15 in parallel with the axial direction D1 and is turned by the protruding member 15, a vortex 15V indicated by curved arrows is generated in the orientation of rotation of the arrows (clockwise). The vortex 15V follows the protruding member 15 to flow rearward (see an arrow of a broken line) while rotating in a spiral manner in the orientation of a left-handed screw contrary to the vortex 5V generated by the protruding member 5 of FIG. 3(a). The orientation of rotation of the vortex 15V is opposite to that of the flap tip vortex 40V that is generated in the orientation going around from the lower surface 302 to the upper surface 301 at the flap tip 40.

When the vortex 15V generated front the protruding member 15 interferes with the upper-side flap tip vortex 41V, the energy of the upper-side flap tip vortex 41V becomes large instead.

Besides, since the vortex 15V and the flap tip vortex 40V have the opposite orientations of rotation, the vortex 15V pushes the flap tip vortex 40V against the upper surface 301 of the flap main body 8 without involving the flap tip vortex 40V. Because of this, the flap tip vortex 40V is held on the upper surface 301 of the flap main body 8.

From the above, when the vortex 15V having the orientation opposite to that of the flap tip vortex 40V is generated by the protruding member 15 having an angle θ in the orientation opposite to that of the protruding member 5 of this embodiment, the pressure fluctuations on the surface of the flap 3 increase by the flap tip vortex 40V. This is contributory to noise. The fact that the protruding member 15 increases the strength of the vortex on the upper surface 301 of the flap 3 is confirmed by a computational fluid dynamics (CFD) simulation.

Description will be given on a sound reduction effect evaluated from results of a wind-tunnel test-using a wind-tunnel test model of an aircraft.

Figure 10:
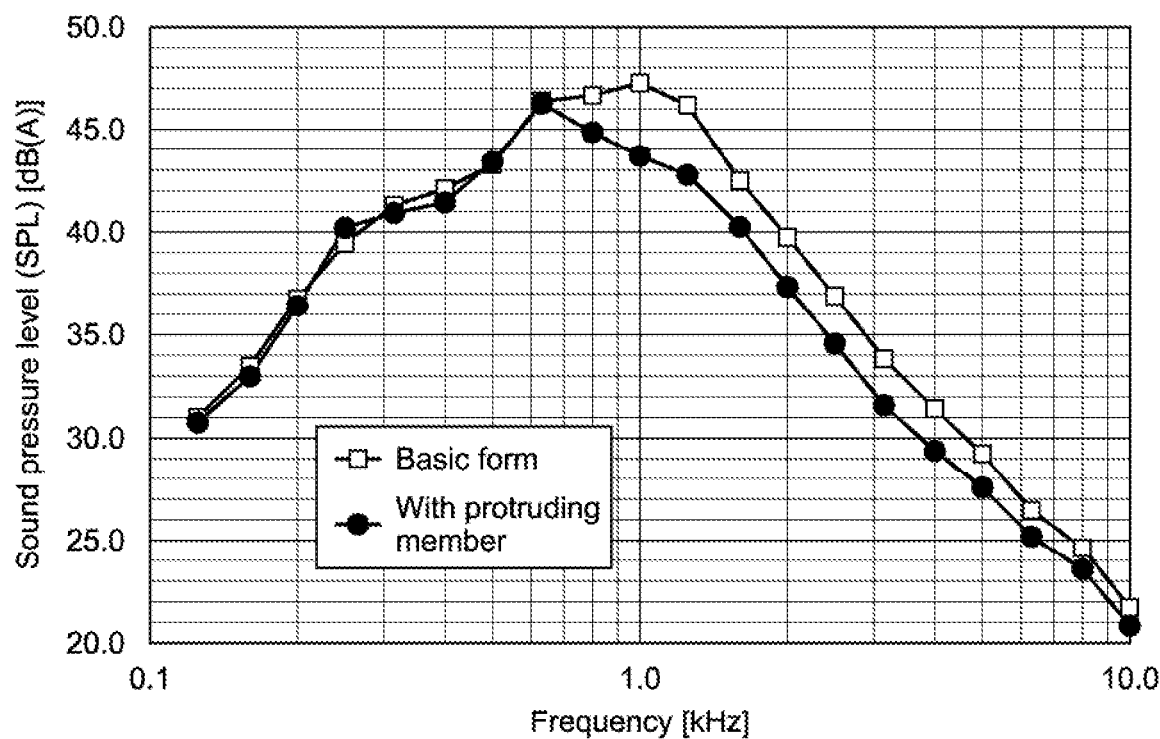
FIG. 10 is a graph showing a relationship with a sound pressure level evaluated from results of a wind-tunnel test using a wind-tunnel test model of an aircraft.

FIG. 10 shows a relationship between a frequency converted into a scale in an actual aircraft and a sound pressure level, in which a sound pressure level (SPL) confirmed for the flap 3 of the first embodiment including the protruding members 5 is plotted by circles (o). Further, a sound pressure level confirmed for the flap 3 (FIG. 3) including no protruding members 5 is plotted by squares (□).

Figure 11:
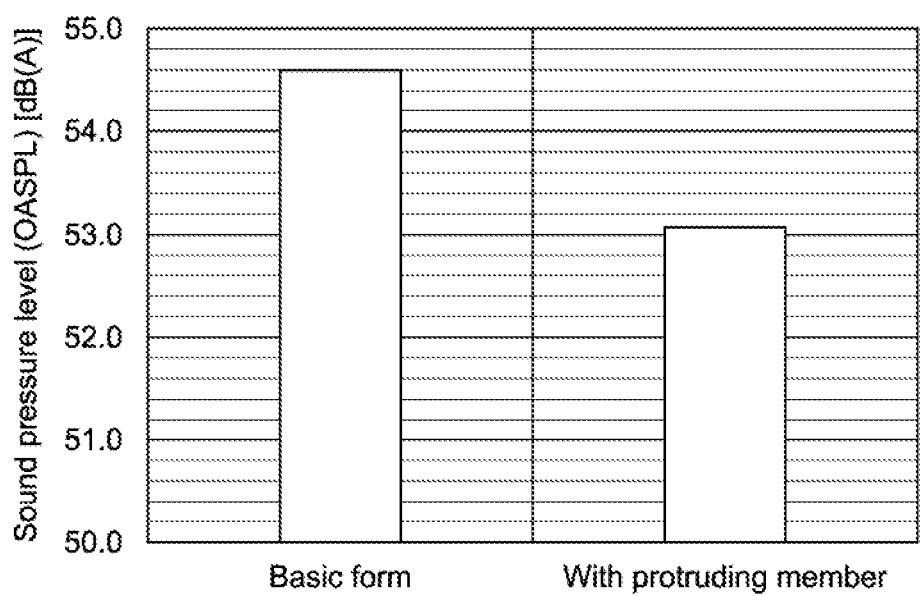
FIG. 11 is a graph showing a total sound pressure level evaluated from the results of the wind-tunnel test using the wind-tunnel test model of the aircraft.

Further, FIG. 11 compares a sound pressure level of the flap 3 of the first embodiment including the protruding members 5 and a sound pressure level of the flap (FIG. 3) including no protruding members 5.

In both of the cases, a measurement location was just below the aircraft.

Further, an evaluation method is as follows.

(1) Noise data only in proximity to the flap was extracted by a noise source identification technique using a microphone array.

(2) For the frequency and the sound pressure level (SPL), a scale effect, a velocity correction, and a distance attenuation correction were added by the following expression and converted into a scale in an actual aircraft.

$$SPL=SPL_{model}+60 \log(U/U_{model})+20 \log(L/L_{model})-20 \log(R/R_{model})$$

Note that the scale effect Lmodel/L is 0.231, in which the wind-tunnel test model is 23.1% of the scale in the actual aircraft, the velocity dependency Umodel/U is 0.791, in which a wind speed of the wind-tunnel test is 53 m/s, and that of the actual aircraft is assumed as 67 m/s, and the distance attenuation correction Rmodel/R is 0.00917, in which a measurement position of the wind-tunnel test is located at 1.1 m below the model, and the actual aircraft is assumed to be located at an altitude of 120 m.

As found from FIGS. 10 and 11, when the flap (flap main body 8) having the basic form is provided with the protruding members 5, the noise reduction effect can be obtained over the bandwidth including a peak frequency of flap noise and also in the total bandwidth.

An example of the form of providing the protruding members 5 described above will be described.

Figure 12:
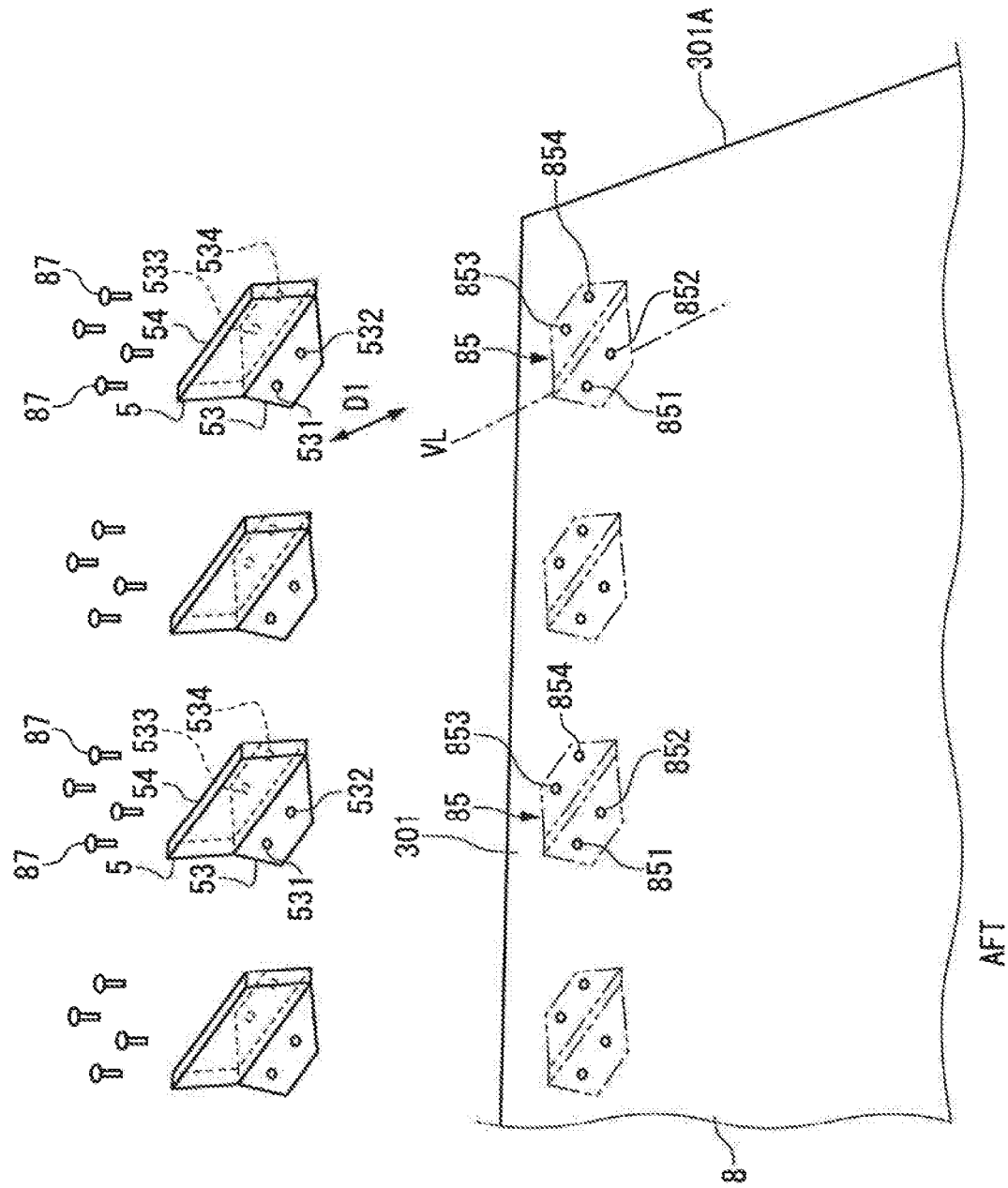
FIG. 12 is a diagram showing an example of the form where the protruding member is installed.

FIG. 12 shows an example in which the protruding members 5 are installed on the upper surface 301 of the flap main body 8 with use of fasteners 87.

The protruding members 5 each include a base 53 and a protrusion 54, the base 53 including a plurality of holes 531 to 534 into which the fasteners 87 are inserted, the protrusion 54 standing from the base 53. The base 53 is formed substantially symmetrically to both sides of the protrusion 54.

The protruding members 5 are fastened to the flap main body 8 by the fasteners 87.

As the fasteners 87, rivets or bolts can be employed.

The flap main body 8 includes installation portions 85 that protrude from the upper surface 301 of the flap tip 40 and on which the protruding members 5 can be installed. The installation portions 85 are disposed as many as the plurality of protruding members 5 at positions corresponding to the respective protruding members 5. A region where the base 53 is disposed on the flap main body 8 is indicated by a two-dot chain line.

Each of the installation portions 85 includes a plurality of fastener insertion portions 851 to 854 that are disposed in proximity to the leading-edge 3A of the flap main body 8 and into which the fasteners 87 are inserted.

The fastener insertion portions 851 and 852 correspond to one side of the base 53 of the protruding member 5. Of those, the fastener insertion portion 851 is located forward, and the fastener insertion portion 852 is located rearward. The fastener insertion portion 852 is located on the side adjacent to the side-end edge 301A relative to the virtual line VL passing through the fastener insertion portion 851 and being parallel to the axial direction D1.

A positional relationship of the fastener insertion portions 853 and 854, which correspond to the other side of the base 53 of the protruding member 5, is also the same as the above.

When an existing flap without the protruding members 5 is also provided with the installation portions 85 to fasten the bases 53 of the protruding members 5 and the flap by the fasteners 87, the protruding members 5 can be equipped.

When bolts are used as the fasteners 87, the protruding members 5 can be detachably provided to the flap main body 8, and thus maintenance performance such as replacement and repair is improved.

In order to fasten the protruding members 5, more fasteners 87 can also be used.

Second Embodiment

A second embodiment of the present invention will be described with reference to FIGS. 13 and 14.

Figure 13:
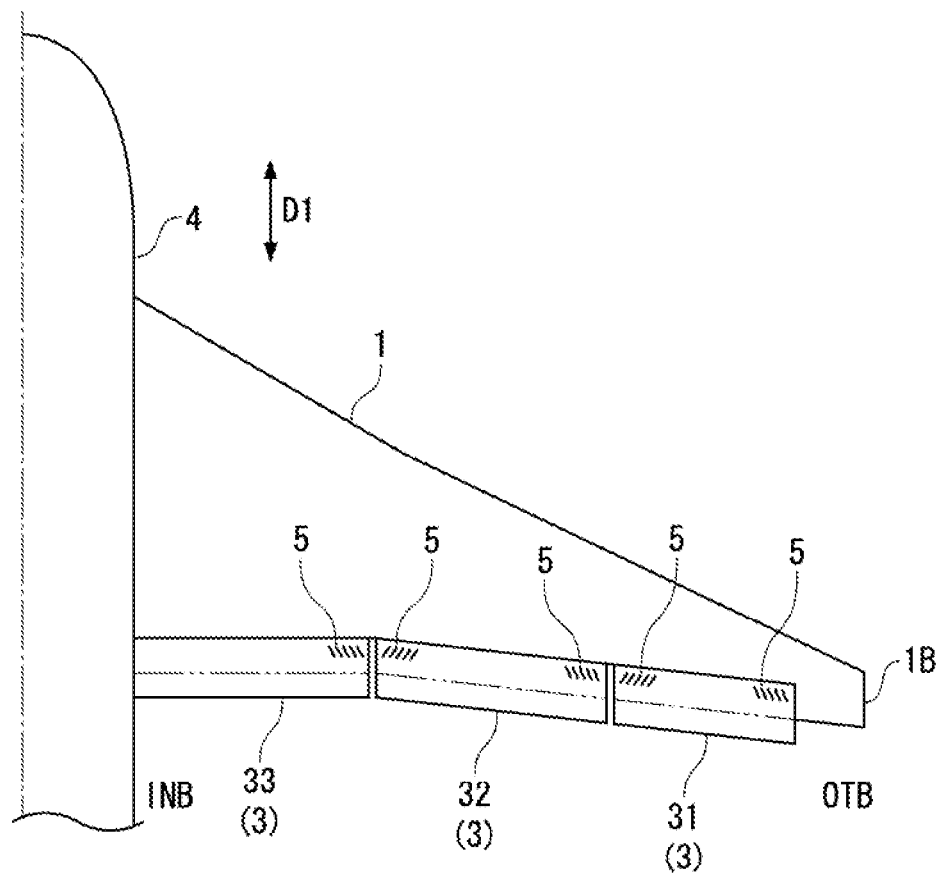
FIG. 13 is a plan view of an aircraft and a flap according to a second embodiment.
Figure 14:
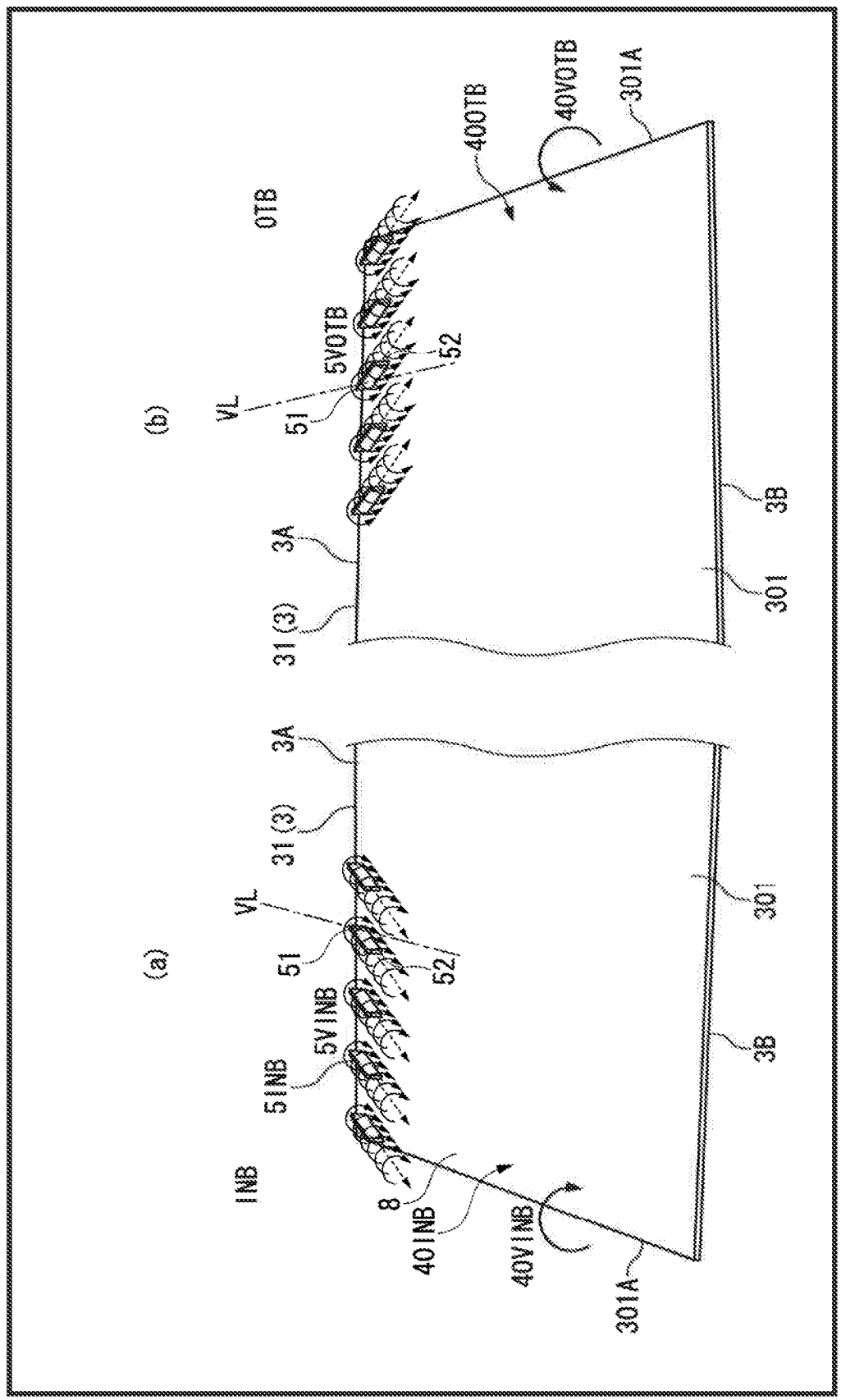
FIG. 14 (*a*) shows a flap tip vortex generated at the end of the flap on the inboard side and a vortex generation portion that generates a vortex caused to interfere with the flap tip vortex, and (*b*) shows a flap tip vortex generated at the end of the flap on the outboard side and a vortex generation portion that generates a vortex caused to interfere with the flap tip vortex.

In the second embodiment, as shown in FIG. 13, three flaps 31, 32, and 33 (outboard flap, mid-board flap, and inboard flap) are disposed on each of the starboard side and the port side of an aircraft. Predetermined gaps are present between those flaps 31 and 32 and between those flaps 32 and 33, and flap tip vortexes similar to those of the former embodiment are generated from those gaps. In this second embodiment, in addition to the end of the outboard flap 31 on the outboard side OTB, the end of the outboard flap 31 on the inboard side INB is also provided with the protruding members 5. Further, the end of the mid-board flap 32 on the outboard side OTB and the end thereof on the inboard side INB are also provided with the protruding members 5. Furthermore, the end of the inboard flap 33 on the outboard side OTB is provided with the protruding members 5.

It should be noted that a similar configuration can be provided also in the case where the flaps (outboard flap and inboard flap) are disposed on each of the starboard side and the port side of the aircraft and gaps are present between those flaps. Further, the same holds true for a case where four or more flaps are disposed.

In FIG. 13, the outboard flap 31, the mid-board flap 32, and the inboard flap 33 are each deployed. In this embodiment, however, the outboard flap 31, the mid-board flap 32, and the inboard flap 33 may be deployed at different timings. FIG. 13 shows the retracted outboard flap 31, mid-board flap 32, and inboard flap 33 by two-dot chain lines.

In such a case, the present invention can be applied even when there are no gaps between the flaps described above. In other words, when only the outboard flap 31 is deployed among the outboard flap 31, the mid-board flap 32, and the inboard flap 33, the end of the outboard flap 31 on the inboard side INB corresponds to a flap tip that protrudes in the airflow to generate a flap tip vortex.

Further, when only the mid-board flap 32 or the inboard flap 33 is deployed, the end of the mid-board flap 32 or inboard flap 33 on the outboard side OTB also corresponds to a flap tip that protrudes in the airflow to generate the flap tip vortex 40V.

In this regard, it is desirable to dispose the protruding members 5 on those flap tips as well and reduce noise resulting from the flap tip vortexes generated at those flap tips.

At the end of the mid-board flap 32 or inboard flap 33 on the outboard side OTB, the flap tip vortex 40V is generated in the orientation similar to that generated at the end of the outboard flap 31 or the like on the outboard side OTB (flap tip 40 of FIG. 7). Thus, a predetermined angle θ of each protruding member 5 that generates the vortex 5V caused to interfere with that flap tip vortex 40V is similar to an angle θ of the protruding member 5 located at the end of the outboard flap 31 on the outboard side OTB. With the protruding members 5 located on the outboard side OTB of the mid-board flap 32 or inboard flap 33, an action and effect similar to that of the protruding members 5 located on the outboard side OTB of the outboard flap 31, which has been described in the first embodiment, is obtained. Description thereof will thus be omitted.

As shown in FIG. 14(a), at an end 40INB of the outboard flap 31 or mid-board flap 32 on the inboard side, a flap tip vortex 40VINB having the orientation opposite to that of a flap tip vortex 40VOTB generated at an end 40OTB on the outboard side shown in FIG. 14(b) is generated.

Thus, since the orientation of a vortex that can be caused to interfere with the flap tip vortex 40VINB is also opposite to the orientation of a vortex 5VOTB generated by a protruding member 5OTB on the outer board side, a protruding member 5INB of the end 40INB is disposed at an angle θ having the orientation opposite to that of the protruding member 5OTB on the outer board side.

Note that each of the protruding member 5OTB on the outboard side and the protruding member 5INB on the inboard side forms a predetermined angle θ in a similar orientation with the virtual line VL being as a reference. In other words, a rear end 52 of the protruding member 5INB on the inboard side is located on the side adjacent to a side-end edge 301A of the end 40INB relative to a virtual line VL passing through a front end 51 of the protruding member 5INB on the inboard side and being parallel to the axial direction D1.

The function of a vortex 5VINB generated by the protruding member 5INB located at the end 40INB on the inboard side enables the flap tip vortex 40VINB to be diffused and to be moved away from the surface of the flap main body 8. This can reduce noise resulting from the flap tip vortex 40VINB.

Figure 15:
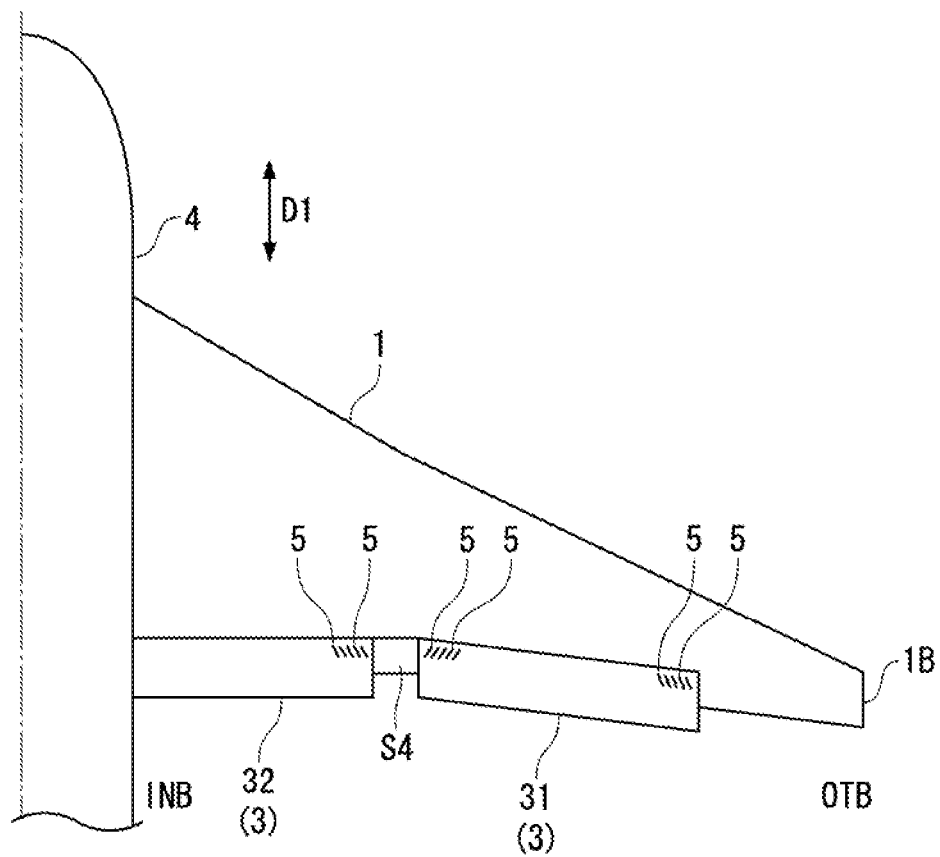
FIG. 15 is a plan view of an aircraft and a flap according to a modified example of the present invention.

FIG. 15 shows a modified example of the present invention.

The outboard flap 31 and inboard flap 32 described above are disposed adjacently to each other. As shown in FIG. 15, however, the outboard flap 31 and the inboard flap 32 may be disposed with a predetermined interval S4 therebetween and another member may be disposed between the outboard flap 31 and the inboard flap 32.

In the configuration shown in FIG. 15, the protruding members 5 are provided to protrude from the upper surfaces of all the flaps 3 at least at the flap tips on the outboard side.

It should be noted that the protruding members 5 can be provided to only some of the flaps provided to the aircraft.

The present invention is not limited to the embodiments described above and can be implemented in various forms without departing from the gist of the present invention, and a feasible range thereof belongs to the technical range of the present invention.

The present invention can be applied to a flap in an appropriate form, such as a slotted flap or a fowler flap.

The above embodiments have described the example in which the present invention is applied to a flap that is provided to a parent wing of an aircraft in a deployable manner. However, the present invention can also be applied to a wing including a wing-like member having an end surface at a wing tip, such as a wing tip of a parent wing of an aircraft or a wind mill. Here, the end surface may have various shapes including not only a planar shape but also a concave shape and a convex shape.

In the embodiments described above, the vortex generation portion includes the protruding member. If the vortex generation portion that generates, from a fluid flowing in a wing span direction of a wing-like member, a second vortex having the same direction of rotation as that of a first vortex generated at a wing tip, is provided in a region adjacent to the wing tip on the upper surface of the wing-like member, this belongs to the technical range of the present invention.

REFERENCE SIGNS LIST 1 main wing
1A trailing-edge
1B wing tip
2 parent wing
2A trailing-edge
3 flap
3A leading-edge
3B trailing-edge
4 fuselage
5 protruding member
5V vortex (second vortex)
6 flap
8 flap main body
13 flap
21 cove portion
21A inner wall
21B wall
31 outboard flap
32 inboard flap
40 flap tip
40V flap tip vortex (first vortex)
50 vortex generation portion

The invention claimed is:
1. A wing, comprising:
a wing-like member that has an end surface at a wing tip; and
a vortex generation portion that generates, from a fluid flowing in a wing chord direction of the wing-like member, a second vortex having the same direction of rotation as that of a first vortex generated at the wing tip,
wherein the vortex generation portion is provided in a region adjacent to the wing tip on an upper surface of the wing-like member so that the second vortex joins the first vortex,
wherein the vortex generation portion includes a plurality of first protruding members, which are arranged along a wing span direction, and a second protruding member, which is the closest to the wing tip in a direction in which the plurality of first protruding members are arranged, being arranged right by the wing tip, and wherein the plurality of first protruding members adjacent to each other are inclined in a same direction so as to come close to the wing tip from a front end of each of the plurality of first protruding members toward a rear end of each of the plurality of first protruding members;

wherein each protruding member on the wing is inclined in the same direction.

2. The wing according to claim 1, wherein
the second protruding member forms a predetermined angle to a direction in which the fluid flows and that generates the second vortex.

3. The wing according to claim 2, wherein
the second protruding member is provided so as to come close to the wing tip from a leading-edge of the wing-like member toward a trailing-edge of the wing-like member.

4. The wing according to claim 1, wherein
a region where the vortex generation portion is provided is located near a leading-edge of the wing-like member.

5. The wing according to claim 1, wherein
a region where the vortex generation portion is provided is in a range separated from a position of the wing tip of the wing-like member by a chord length of the wing-like member in the wing span direction of the wing-like member.

6. The wing according to claim 1, wherein
a height of each of the plurality of first protruding members from the upper surface of the wing-like member is twice or more than twice a thickness of a boundary layer generated on the upper surface of the wing-like member.

7. A flap, comprising:
a flap main body that is provided to a parent wing of an aircraft in a deployable manner and has an end surface at a flap tip; and
a vortex generation portion that generates, from a fluid flowing in an axial direction of the aircraft, a second vortex having the same direction of rotation as that of a first vortex generated at the flap tip,
wherein the vortex generation portion is provided in a region adjacent to the flap tip on an upper surface of the flap main body so that the second vortex joins the first vortex,
wherein the vortex generation portion includes a plurality of first protruding members, which are arranged along a wing span direction, and a second protruding member, which is the closest to the flap tip in a direction in which the plurality of first protruding members are arranged, being arranged right by the flap tip, and
wherein the plurality of first protruding members adjacent to each other are inclined in a same direction so as to come close to the flap tip from a front end of each of the plurality of first protruding members toward a rear end of each of the plurality of first protruding members;
wherein each protruding member on the wing is inclined in the same direction.

8. The flap according to claim 7, wherein
the second protruding member forms a predetermined angle to a direction in which the fluid flows and that generates the second vortex.

9. The flap according to claim 8, wherein
a rear edge of the second protruding member is located on the side adjacent to the flap tip of the flap main body in the wing span direction relative to a virtual line passing through a front edge of the second protruding member and being parallel to the axial direction.

10. The flap according to claim 8, wherein
the second protruding member is disposed near the leading-edge of the flap main body such that the second protruding member is exposed from the parent wing when the flap main body is deployed, and that the second protruding member is hidden by the parent wing when the flap main body is retracted in the parent wing.

11. The flap according to claim 7, wherein
the vortex generation portion is disposed in a region from a position of the flap tip of the flap main body to a position separated by a chord length of the flap main body in the wing span direction.

12. An aircraft comprising the flap according to claim 7.

13. The flap according to claim 7, wherein
a height of each of the plurality of first protruding members from the upper surface of the flap main body is twice or more than twice a thickness of a boundary layer generated on the upper surface of the flap main body.

* * * * *